US011077772B2

(12) United States Patent
Brewer et al.

(10) Patent No.: US 11,077,772 B2
(45) Date of Patent: Aug. 3, 2021

(54) VEHICLE SEAT TRACK SYSTEM

(71) Applicant: Adient Engineering and IP GmbH, Burscheid (DE)

(72) Inventors: William Shawn Brewer, Plymouth, MI (US); Vasile Nae, Commerce, MI (US)

(73) Assignee: Keiper Seating Mechanisms Co., Ltd, Shanghai (CN)

( * ) Notice: Subject to any disclaimer, the term of this patent is extended or adjusted under 35 U.S.C. 154(b) by 40 days.

(21) Appl. No.: 15/447,938

(22) Filed: Mar. 2, 2017

(65) Prior Publication Data

US 2018/0251045 A1    Sep. 6, 2018

(51) Int. Cl.
*B60N 2/07* (2006.01)

(52) U.S. Cl.
CPC ............ *B60N 2/0727* (2013.01); *B60N 2/07* (2013.01); *B60N 2/0705* (2013.01); *B60N 2/0715* (2013.01)

(58) Field of Classification Search
CPC .. B60N 2/0705; B60N 2/0715; B60N 2/0722; B60N 2/0725; B60N 2/0727; B60N 2/07
USPC ................................................ 248/429, 430
See application file for complete search history.

(56) References Cited

U.S. PATENT DOCUMENTS

| | | | | |
|---|---|---|---|---|
| 7,594,635 B2* | 9/2009 | Kojima | ................ | B60N 2/0722 248/429 |
| 7,669,826 B2* | 3/2010 | Hayakawa | ........... | B60N 2/0705 248/430 |
| 8,191,850 B2* | 6/2012 | Wetzig | ................. | B60N 2/0727 248/429 |
| 8,322,677 B2* | 12/2012 | Nonomiya | ........... | B60N 2/0747 248/430 |
| 8,702,053 B2* | 4/2014 | Line | ..................... | B60N 2/0732 248/424 |
| 8,814,123 B2* | 8/2014 | Suzuki | ..................... | B60N 2/06 248/430 |

(Continued)

FOREIGN PATENT DOCUMENTS

| | | |
|---|---|---|
| CN | 105365607 A | 3/2016 |
| EP | 0 834 419 A1 | 4/1998 |

(Continued)

OTHER PUBLICATIONS

Chinese Patent and Trademark Office, Office Action in application No. CN201810171176.1, dated Nov. 18, 2020, 14 pages.

*Primary Examiner* — Jonathan Liu
*Assistant Examiner* — Guang H Guan
(74) *Attorney, Agent, or Firm* — Marshall & Melhorn, LLC (57) ABSTRACT

A track system for a vehicle seat includes a lower track with a slide block with lateral slide bar extending along an upper surface of the lower track. The slide block includes a cross web system connecting the first slide bars with a central cross web portion, a forward cross web portion and a rearward cross web portion. A lower track to slide block fastening system includes a central fastener fixing the central cross web portion to the lower track in lateral and longitudinal directions and allowing movement in a direction away from the lower track, a forward fastener fixing the forward cross web portion in the direction away from the lower track and allowing movement in longitudinal directions and a rearward fastener fixing the rearward cross web portion in the direction away from the lower track and allowing movement in the longitudinal directions.

16 Claims, 5 Drawing Sheets

(56) References Cited

U.S. PATENT DOCUMENTS

| | | | |
|---|---|---|---|
| 9,387,779 B2* | 7/2016 | Mischer | B60N 2/0705 |
| 9,783,083 B2* | 10/2017 | Sato | B60N 2/0705 |
| 10,046,672 B2* | 8/2018 | Kuroda | B60N 2/0722 |
| 2016/0039313 A1* | 2/2016 | Kuroda | B60N 2/0722 |
| | | | 248/429 |
| 2018/0251045 A1* | 9/2018 | Brewer | B60N 2/682 |

FOREIGN PATENT DOCUMENTS

| | | |
|---|---|---|
| EP | 2 985 174 A1 | 2/2016 |
| FR | 2 230 518 A1 | 12/1974 |
| FR | 2 237 449 A5 | 2/1975 |
| JP | 2008044518 A | 2/2008 |
| WO | WO-2018029149 A1 * 2/2018 | ........... B60N 2/0705 |

* cited by examiner

VEHICLE SEAT TRACK SYSTEM

FIELD OF THE INVENTION

The present invention relates to vehicle seats in general and more particularly to a vehicle seat track system allowing the vehicle seat to be moved in a forward and rearward direction.

BACKGROUND OF THE INVENTION

Vehicle seat track systems (rail systems) have been provided including a lower track and an upper track. A rolling bearing cage may be provided between the upper track on the lower track. Further, slide blocks or sliding member inserts may be provided on the lower track. These provide a smooth sliding surface for the upper track to slide along.

Such a slide block may be fixed to the lower track. However, with the movements of the upper track along the slide block, there can be a deflection of the slide block. For example, with the upper track in a forward position relative to the slide block and the lower track, the more rearward slide surfaces of the sliding block may deform or bow out of position. There may also be a binding or clicking when adjusting the position of the upper track relative to the lower track. These problems may be magnified by selecting materials for the slide block which are different from the track. For example, the deflection and bowing can be more problematic with a slide block formed of plastic. Further, it may be desirable to provide slide block configurations that use less materials. The slide block may comprise a structure with openings, webs or other configurations that connect to and/or form the slide surfaces with less material. However, the above noted problems may be further magnified with less material or features that are less structurally robust. In particular, with less material forming the slide surfaces and with less material joining the slide surfaces at each side of the slide block, there can be significant deformation and bowing and movement out of position, binding and or clicking when adjusting the position of the upper track relative to the lower track.

SUMMARY OF THE INVENTION

It is an object of the invention to provide a vehicle track system with a slide block that is connected to the remainder of the track system in such a way as to avoid the problems noted above.

It a further object of the invention to provide a vehicle track system with a slide block which connects to the lower track in a manner which avoids subjecting the slide block to compressive loading and which maintains the slide block against the lower track or at least minimizes deflections, binding of the slide block and risks associated with slide block movement.

The invention is based on the recognition that previous slide block designs and configurations experienced issues with the slide surfaces bowing out of position and binding or clicking when adjusting the track—adjusting the position of an upper track relative to a lower track. Slide blocks that are designed with reduced material, wherein a section of the slide block is smaller than previous slide blocks because of the slide block profile design, are especially prone to bowing and partial deflection. The invention is based on the realization of a cause of the slide block bowing problem being related to the placement of attachment points of the slide block at the ends of the slide block. When the attachments are at the ends of the slide block, the slide block is subjected to longitudinal compressive loading between the end of the upper track and the attachment point, particularly at the extremes of adjustment travel. The slide block section is not stiff enough to react to the compressive loading without deflection, which moves the slide block out of the correct location creating binding or movement of the slide block that can result in operation noises.

According to the invention, a track system is provided for a vehicle seat. The track system comprises a lower track having a track profile with a lower vehicle attachment surface and an upper surface extending in a longitudinal axial direction between a lower track forward end and a lower track rearward end and extending in a lateral direction between lower track side profile portions. A slide block is provided comprising a first slide bar extending along the upper surface at a first lower track lateral side, a second slide bar extending along the upper surface at a second lower track lateral side and a cross web system connecting the first slide bar to the second slide bar. The cross web system comprises a central cross web portion, a forward cross web portion, positioned with respect to the longitudinal axial direction between the lower track forward end and the central portion, and a rearward cross web portion, positioned with respect to the longitudinal axial direction between the lower track rearward end and the central portion. A lower track to slide block fastening system is provided comprising a central fastener fixing the central cross web portion relative to the lower track at least in the lateral directions and in the longitudinal axial directions, a forward fastener fixing the forward cross web portion relative to the lower track in the direction away from the lower track and allowing at least some movement of the forward cross web portion relative to the lower track at least in the longitudinal axial directions and a rearward fastener fixing the rearward cross web portion relative to the lower track in the direction away from the lower track and allowing movement of the rearward cross web portion relative to the lower track at least in the longitudinal axial directions.

The central fastener may comprise a central opening formed in the lower track, wherein the central opening has an annular inner peripheral edge and a central fastener portion connected to the central cross web portion. The central fastener portion extends through the central opening and has a shape adapted to engage at least portions of the annular inner peripheral edge. A movement of the central fastener portion relative to the lower track is restricted by the annular inner peripheral edge in all radial directions of the central fastener portion relative to the central opening. The central fastener portion may have a fastener profile that is complementary to, extending through and being essentially coaxial with the central opening. This configuration allows at least some movement of the central cross web portion relative to the lower track in a direction toward and away from the lower track.

The forward fastener may comprise a forward opening formed in the lower track and a forward fastener portion connected to the forward cross web portion. The forward opening has an annular inner peripheral edge. The forward fastener portion has a through portion extending through the forward opening from an upper surface side of the lower track to a lower vehicle attachment surface side of the lower track and includes an axial extension extending axially beyond the inner peripheral edge of the forward opening. The axial extension has an axially extending surface, to engage the lower vehicle attachment surface and to limit movement of the forward cross web portion relative to the lower track in a direction toward and away from the lower track. The forward opening, formed in the lower track, may be sized relative to the through portion of the forward fastener portion to allow at least some movement of the forward fastener portion relative to the lower track in the longitudinal axial directions of the forward fastener portion relative to the forward opening.

The rearward fastener may comprise a rearward opening formed in the lower track and a rearward fastener portion connected to the rearward cross web portion. The rearward opening has an annular inner peripheral edge. The rearward fastener portion has a through portion extending through the rearward opening from an upper surface side of the lower track to a lower vehicle attachment surface side of the lower track and includes an axial extension extending axially beyond the inner peripheral edge of the rearward opening. The axial extension has an axially extending surface to engage the lower vehicle attachment surface and limit movement of the rearward cross web portion relative to the lower track in a direction toward and away from the lower track. The rearward opening, formed in the lower track, may be sized relative to the through portion of the rearward fastener portion to allow at least some movement of the rearward fastener portion relative to the lower track in the longitudinal axial directions of the forward fastener portion relative to the forward opening.

The slide block may be a single integral plastic part including the fastener portions of the central fastener, the forward fastener and the rearward fastener.

The track system may further comprise a rolling bearing cage connected to the upper track. The slide block supports the movement of the upper track and has end stops for the rolling bearing cage. The first slide bars may be parallel slide block brackets for the movable support of the upper track. Each of the end stops, for a rolling bearing cage, extends outwards and protrudes from a respective one of the slide block supports. Another essentially identical rolling body cage may be provided so as to provide two rolling body cages which are arranged on opposite sides relative to the slide block. Each rolling body cage may have a portion facing the slide block comprising a contact portion which is complementary to associated two end stops at each lateral side of the slide block, whereby with respect to the longitudinal axial direction the two end stops limit a travel of the associated rolling body cage. Each contact portion may be formed of an elastically deformable material. The contact portion is deformed upon bearing on an associated end stop and upon sliding away from the associated end stop returns to an original form.

According to a further aspect of the invention, a vehicle seat is provided. The vehicle seat comprises a seat base and a track system according to the invention.

By relocating the fore/aft slide block to lower track attachment to the center of the side block and removing all fore/aft load reacting attachments on the ends, the possibility of subjecting the slide block to compressive loading is eliminated. The invention provides end attachments, or rather near end attachments—forward attachments and rearward attachments of the slide block to the lower track—with features which act only in the vertical (vehicle Z direction) and lateral directions to keep the slide block against the lower track in the correct position. This involves connection gaps in the fore-aft direction for limited movement in the forward-rearward direction. This solution is simpler and more effective than keeping the fore/aft attachments at the ends of the slide block. The solution of the invention is also simpler and more effective than increasing the strength of those attachments and/or increasing the slide block cross section to minimize the deflection, binding, and slide block movement risk.

Advantageously the track system of the invention is configured such that the central slide block attachment, the forward slide block attachment and the rearward slide block attachment are each in a location that is always under the upper track after the initial track assembly for all subsequent track marriage and end customer product functional positions.

The invention may provide a configuration which is similar to the track arrangement of DE 102016217945.4, particularly as to the upper and lower tracks, track profiles and roller bearing arrangement (DE 102016217945.4 is incorporated herein by reference in its entirety). However, the slide block cross web system and lower track to slide block fastening system of the present invention provide particularly advantageous track system characteristics.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
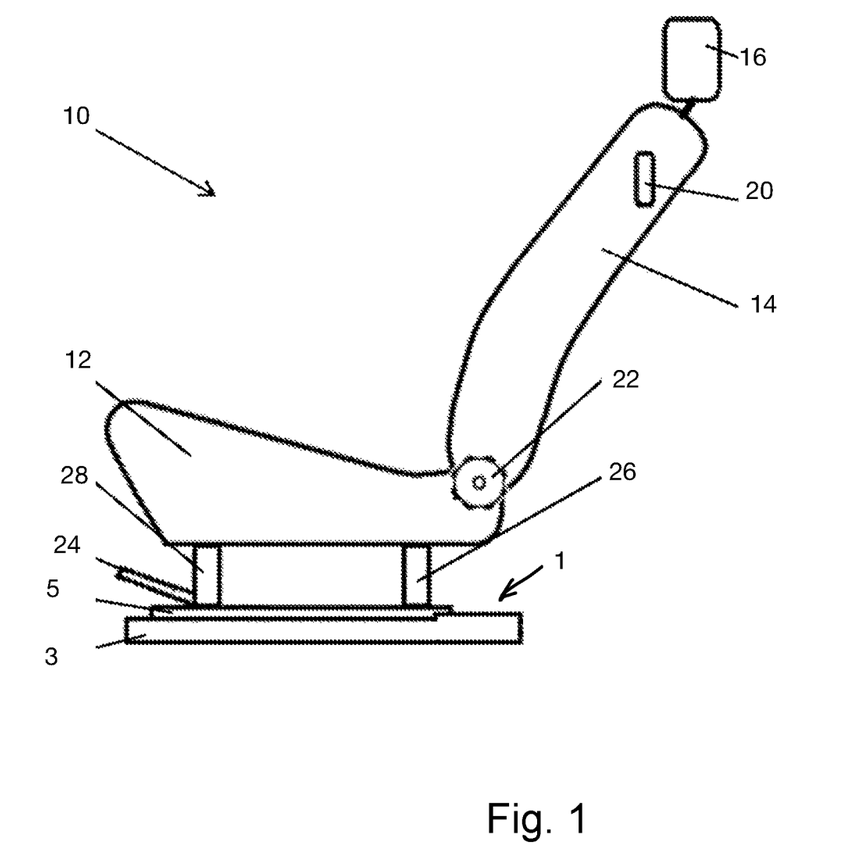
FIG. 1 is a schematic view of the vehicle seat with a track system according to the invention.

Referring to the drawings in particular, FIG. 1 shows a vehicle seat generally designated 10. The vehicle seat 10 includes a track system (rail system) 1 according to the invention. The track system 1 includes an lower track 3 and an upper track 5. The vehicle seat 10 includes a seat base (cushion) 12, a backrest 14 and a headrest 16. The backrest 14 is connected by a pivot/recliner fitting 22 to allow adjustment of the pivot position of the backrest 14 relative to the seat base 12. The vehicle seat 10 may have other typical features such as an easy entry actuator 20 which allows the backrest 14 to be pivoted forward, for easy entry to a region behind the vehicle seat 10. The vehicle seat 10 is mounted on the upper track 5 via seat to upper track connections 26 and 28. The vehicle seat 10 includes a longitudinal adjustment actuator 24 which allows the upper track 5, caring the vehicle seat 10, to be moved forwards and rearwards in a longitudinal direction (such as in the z direction of the vehicle). The vehicle seat 10 may also include features to allow the upper track 5 to move relative to the lower track 3 as part of the easy entry actuation with easy entry actuator 20. Although a particular type of vehicle seat 10 is shown, with seat base 12 and backrest 14 connected via a recliner fitting 22, other types of vehicle seats may also use the track system 1 according to the invention. For example, the vehicle seat 10 could be a so-called slouch seat with the seat base and the backrest each moveable relative to one or more frame parts and with the frame parts mounted to the upper track 5. Further, although the term lower is used with regard to the lower track 3, the track system 1 could be used for example as part of a backrest track system for a slouch seat wherein it would be possible to have the lower track 3 vertically above the upper track 5. However, generally, the track system 1 is to be used with the lower track 3 fixed to a vehicle floor and the upper track 5 mounted thereto, vertically above the lower track 3 and connected to and supporting the seat base 12.

Figure 2:
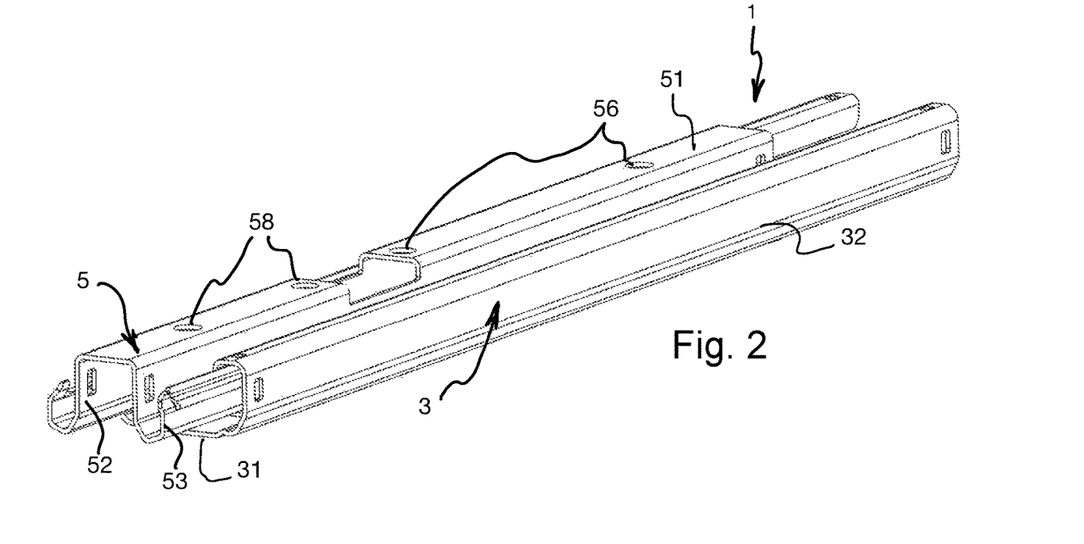
FIG. 2 is a top perspective view of the track system of FIG. 1.

FIG. 2 shows the track system 1 with the upper track generally designated 5 and the lower track generally designated 3. The upper track 5 includes rear support connection openings 56 and forward support connection openings 58 which are used for fixing the vehicle seat 10 via the upper track connections 26 and 28 respectively. The upper track 5 has a profile including upper track outer section 53 and upper track mid section 52. The upper track outer section 53 and upper track mid section 52, each side of the upper track 5, are connected by a central section 51. The lower track 3 has a profile, including a lower track central portion 31 and laterally spaced apart side profile portions 32. Each side profile portion 32 extends around to an end portion 33. The lower track 3 is connected with the upper track 5 with an interference fit.

Figure 5:
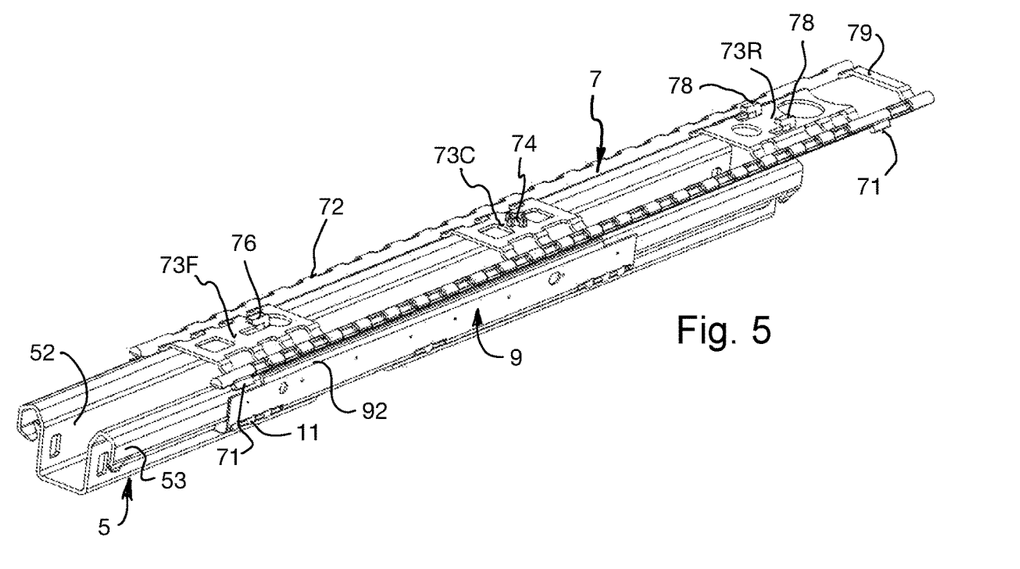
FIG. 5 is a bottom perspective view of the track system of FIG. 1 with the lower track removed.
Figure 9:
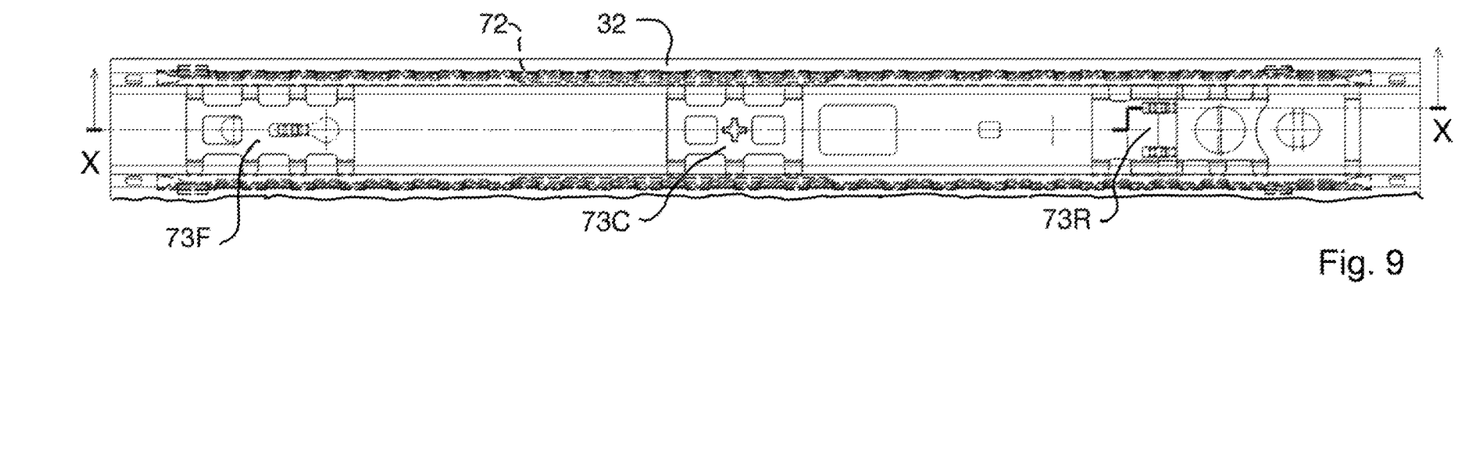
FIG. 9 is a top partially cutaway view showing the lower track and slide block.

The track system 1 includes a slide block 7, which can best be seen in FIGS. 5 and 9. The slide block 7 has lateral slide bars 72, that are disposed between the upper track 5 and the lower track 3 as can best be seen in FIG. 3. The slide bars 72 of the slide block 7 provide a smooth sliding surface for movement of the upper track 5 relative to the lower track 3. This allows the upper track 5 to be moved in a longitudinal axial direction of the track system 1 between a forward most position and a rearward most position. These positions may be set by stops 71.

Figure 3:
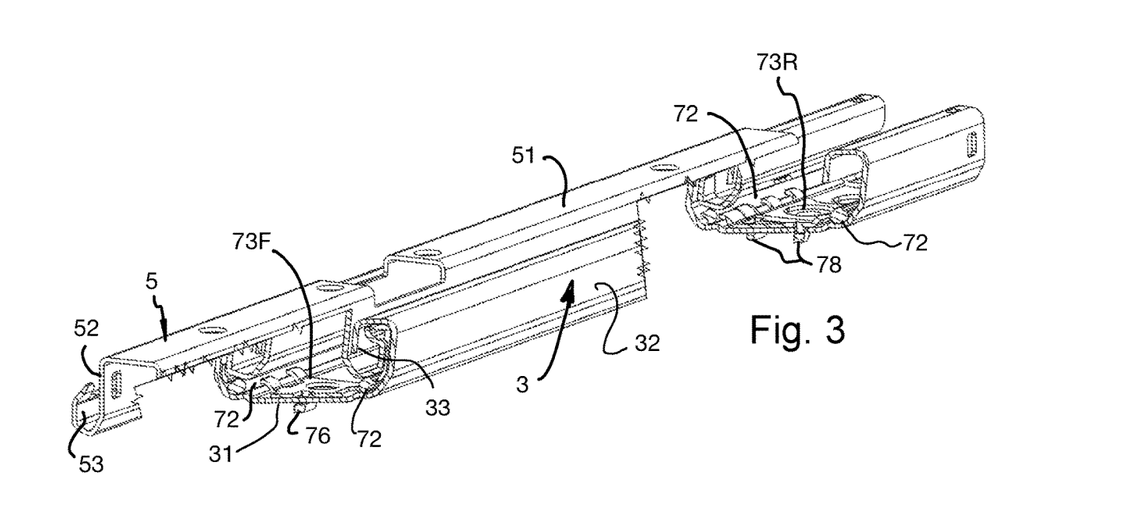
FIG. 3 is a top perspective partially cutaway view of the track system of FIG. 1.

The slide block 7 is advantageously made of a plastic material. The slide block 7 includes web portions, namely a forward web portion 73F, a central web portion 73C, a rearward web portion 73R and an additional rearmost web 79, which connect across from one lateral slide bar 72 to an opposite lateral slide bar 72. The web portions 73F, 73C, 73R and 79 position and support the lateral slide bars 72. The invention provides a plurality of these web portions 73F, 73C, 73R as part of a lower track to slide block fastening system. In particular, the forward web portion 73F includes a forward fastener portion 76, to connect the slide block 7 to the lower track 3. The rearward web portion 73R includes two rearward fastener portions 78, to connect the slide block 7 to the lower track 3. The central web portion 73C includes a central fastener portion 74 to connect the slide block 7 to the lower track 3. The fastener portions 74, 76 and 78 cooperate with a central fastener opening 34, a forward fastener opening 36 and rearward fastener openings 38 respectively. Preferably, the slide block system 1 is configured such that the forward web portion 73F, including the forward fastener portion 76, the rearward web portion 73R, including the two rearward fastener portions 78, and the central web portion 73C, including the central fastener portion 74, are in locations that are always under the upper track 5 for all functional positions of the upper track 5 relative to the lower track 3. An extreme forward position, the upper track 5 relative to the lower track 3, is shown in FIG. 3, wherein the rearward web portion 73R, including the two rearward fastener portions 78, is still under the upper track 5.

The track system 1 includes a roller bearing arrangement for each side of the tracks. Each bearing arrangement has a roller bearing cage 9 supporting a plurality of roller bearings 11. One of the two roller bearing cages 9 can best be seen in FIG. 5. Each of the roller bearing cages 9 is disposed between one of the side profile portions 32 of the lower track 3 and the upper track outer section 53 of the upper track 5. The roller bearing cage 9 may have spacing lugs at each side face of the roller bearing cage 9. The spacing lugs provide appropriate spacing between the roller bearing cage 9 and the upper track outer section 53 on the one hand and provide appropriate spacing between the roller bearing cage 9 and the side profile portion 32 on the other hand. The roller bearing cage 9 positions the roller bearings 11 to roll between an outer surface of the upper or track outer section 53 of the upper track 5 and an inner surface of the side profile portion 32 of the lower track.

The slide block 7 supports the movement of the upper track 5 with two slide bars or slide block brackets 72. The supported movement of the upper track 5 is provided by the first side slide bar 72 and the second side slide bar 72, which are disposed running parallel to each other and extend in a longitudinal axial direction of the track system 1. The slide block 7 includes a plurality of end stops 71. An end stop 71 is provided at an end of each of the slide bars 72, providing two end stops 71 at each side of the lateral slide block 7. These two end stops 72 (at each of the two lateral sides) delimit the range of travel of the respective roller bearing cage 9. Each rolling body cage 9 has a portion facing the sliding block 7. As can be seen in FIG. 5, the rolling body cage 9 has a contact portion 92 which extends in the longitudinal axial direction. In FIG. 5, the contact portion 92 has nearly reached the left end stop 71. The contact portion 92 is complementary to the associated two end stops 71 at each of the lateral sides of the sliding block. With respect to the longitudinal axial direction, the two end stops 71 limit a travel of the associated rolling body cage 9. The contact portion 92 is formed of an elastically deformable material. The contact portion 92 is deformed upon bearing on an associated end stop 71 and upon sliding away from the associated end stop 71, the contact portion 92 returns to an original form.

As can be seen in FIG. 5, the slide block 7 is provided with web portions 73F, 73C, 73R and 79 connecting the slide bars 72. Preferably, very little material is used to provide the slide block 7. Besides the mentioned forward web portion 73F, rearward web portion 73R, central web portion 73C, and the additional rearmost web 79, other web portions may be provided connecting the slide bar 72. However, advantageously, the slide block 7 is formed with relatively little material, to save costs and to reduce weight. Further, the slide bars 72 are provided with a configuration with reduced material at a side facing the upper surface of the lower track central portion 31 (FIG. 5). The slide block 7 may be formed as a molded plastic piece, such as an injected molded integral single plastic part.

Figure 4:
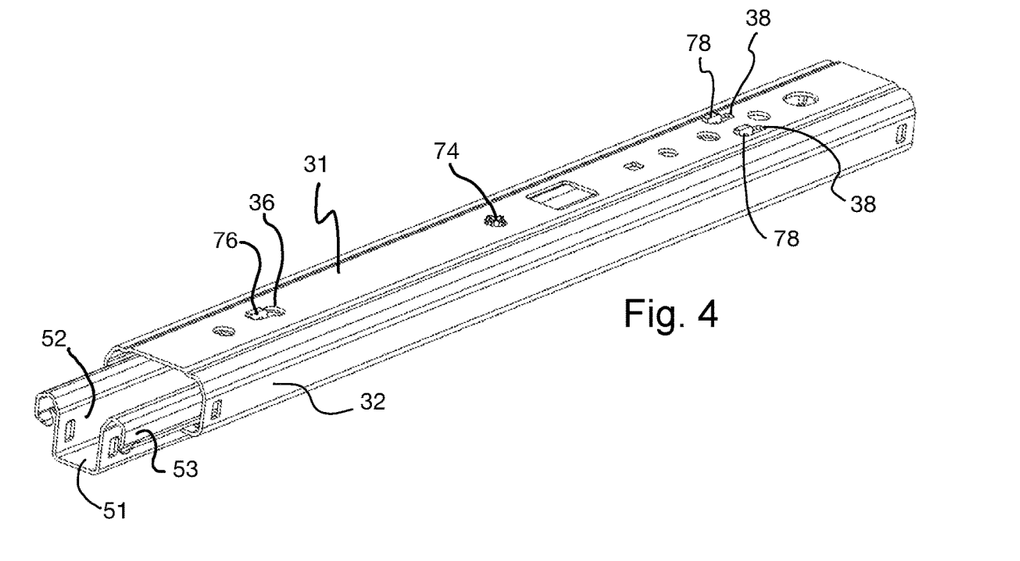
FIG. 4 is a bottom perspective view of the track system of FIG. 1.

As can be appreciated from the bottom perspective view of FIG. 4, the lower track 3 has a track profile with a lower vehicle attachment surface, which is the lower, vehicle floor facing, surface of the lower track central portion 31. This vehicle floor facing surface and the opposite upper surface of lower track central portion 31 extend in the longitudinal axial direction between a lower track forward end and a lower track rearward end. The lower track 3 also extends in a lateral direction between side profile portions 32. The lateral extent of the lower track 3 can be seen in the partial sectional view of FIG. 3. FIG. 5 shows the forward web portion 73F, rearward web portion 73R and central web portion 73C of the sliding block 7 extending, in the lateral direction, from one slide bar 72 at one lateral side to another slide bar 72 at an opposite lateral side. The slide bars 72, extending along the upper surface of the lower track central portion 31, can be seen in the partial sectional view of FIG. 3.

Figure 6:
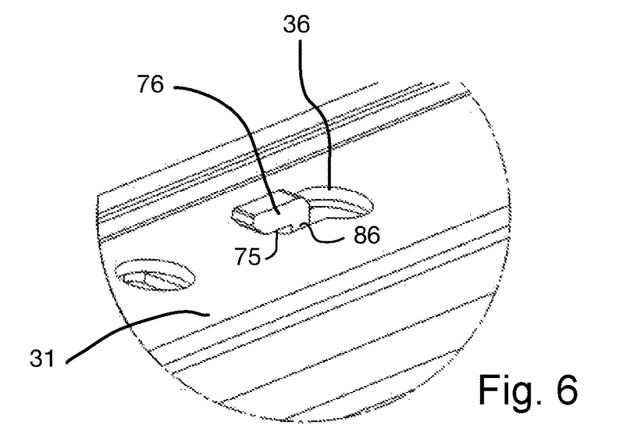
FIG. 6 is an enlarged detail view of the front fastener of the fastening system according to the invention.
Figure 10:
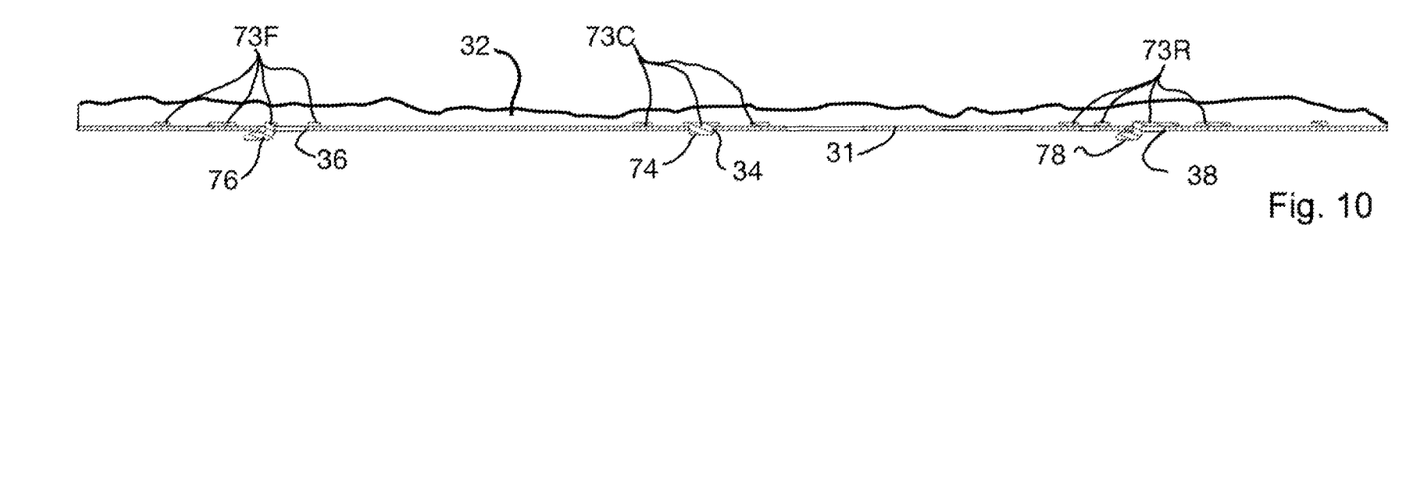
FIG. 10 is a partially cutaway sectional view taken along section line X-X of FIG. 9.

FIG. 6 shows a configuration of the forward fastener of the lower track to sliding block fastening system. The forward fastener is comprised of a forward fastener opening 36, that is formed in the lower track 3. The forward opening has an annular inner peripheral edge. The forward fastener portion 76, that is connected to the forward cross web portion 73F, cooperates with the fastener opening 36 and the lower vehicle attachment surface of the lower track central portion 31, to provide the unique fastening features of the forward fastener. The forward fastener portion 76 has a through portion 86 that extends through the forward fastening opening 36, from an upper surface side of the lower track 3 to the lower vehicle attachment surface side of the lower track 3. The forward fastener portion 76 also includes an axial extension, extending axially beyond the inner peripheral edge of the forward opening 36. The axial extension of the forward fastener portion 76 has an axially extending surface 75 to engage the lower vehicle attachment surface. This axially extending surface 75, engaging the lower vehicle attachment surface, limits movement of the forward cross web portion 73F relative to the lower track 3 in a direction toward and away from the lower track 3. The forward opening 36 is formed in the lower track and is sized relative to the through portion 86 of the forward fastener portion 76 to allow at least some movement of the forward fastener portion 76 relative to the lower track 3 in the forward—rearward direction. In particular the forward fastener portion 76 has a through portion, that extends through the forward fastening opening 36 (FIG. 10). This through portion of the fastener portion 76 is limited as to freedom of motion based on the contact of the through portion of forward fastener portion 76 by the inner peripheral edge of the forward opening 36. According to the preferred embodiment the peripheral edge of the forward opening 36 is sized relative to the through portion of forward fastener portion 76 to essentially prevent lateral movement of the forward fastener portion 76 based on the lateral sides of the inner peripheral edge of the forward opening 36. However, the opening 36 is also sized to allow significant movement of the forward fastener portion 76 in the forward—rearward (longitudinal axial) direction. The forward fastener fixes the forward cross web portion 73F relative to the lower track in the direction away from the lower track and in the lateral directions and allows at least some movement of the forward cross web portion 73F relative to the lower track at least in the longitudinal axial directions.

Figure 7:
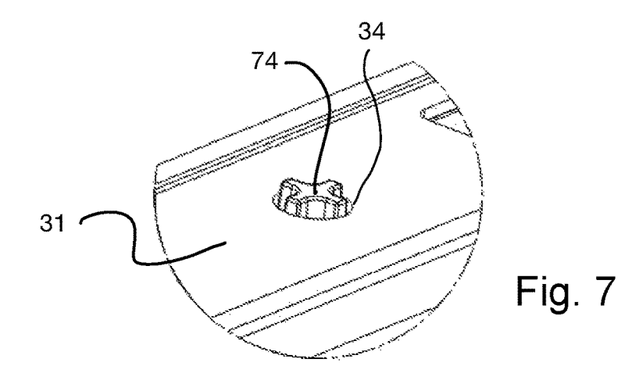
FIG. 7 is an enlarged detail view of the central fastener of the fastening system according to the invention.

FIG. 7 shows a configuration of the central fastener of the lower track to sliding block fastening system. The term central is not to imply that the central fastener is in the geometric or mass center of the slide block 7, but that the central fastener is in some central region relative to the forward and rearward fasteners. However, the location could be at the geometric or mass center of the slide block 7. The central fastener fixes the central cross web portion 73C relative to the lower track 3 at least in the lateral directions and in the longitudinal axial directions. The central fastener comprises a central opening 34 that is formed in the lower track central portion 31 of the lower track 3. The central opening 34 has an annular inner peripheral edge. The central fastener portion 74 is connected to the central cross web portion 73F and may be formed integral therewith, as part of the integral single plastic part. The central fastener portion 74 extends through the central opening 34 and is essentially coaxial with the central opening 34 (FIG. 10). The fastener portion 74 has a shape adapted to engage at least portions of the annular inner peripheral edge of the opening 34. With this configuration movement of the central fastener portion relative to the lower track is restricted by the annular inner peripheral edge. The restriction of movement is in all radial directions of the central fastener portion 74 relative to the central opening 34. The shape of the central fastener portion 74 may be complementary to the central opening 34. The shapes may match or, in the configuration shown the central fastener portion 74, may have a cross shape with each of the four outer edge surfaces contacting the inner peripheral edge of the opening 34. The configuration of the central fastener portion 74, with a fastener profile extending through and being essentially coaxial with the central opening 34, allows at least some movement of the central cross web portion 73C relative to the lower track 3 in a direction toward and away from the lower track 3.

Figure 8:
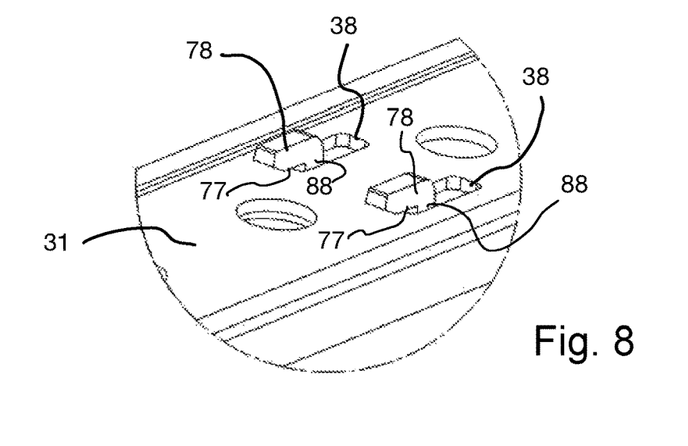
FIG. 8 is an enlarged detail view of the rearward fastener of the fastening system according to the invention.

FIG. 8 shows a configuration of the rearward fastener of the lower track to sliding block fastening system. The rearward fastener fixes the rearward cross web portion 73F relative to the lower track 3 in the direction away from the lower track and allows at least some movement of the rearward cross web portion 73R relative to the lower track 3 at least in the longitudinal axial directions. The rearward fastener comprises a rearward opening 38 formed in the lower track 3. The rearward opening 38 has an annular inner peripheral edge. The rearward fastener portions 78 are each connected to the rearward cross web portion 73F. The rearward fastener portions 78 have a through portion 88 extending through the rearward opening 38 from an upper surface side of the lower track 3 to a lower vehicle attachment surface side of the lower track 3. The rearward fastener portions 78 include an axial extension, which extends axially beyond the inner peripheral edge of the rearward opening 38. The axial extension of the rearward fastener portions 78 includes an axially extending surface 77 to engage the lower vehicle attachment surface and limit movement of the rearward cross web portion 73R relative to the lower track 3 in a direction toward and away from the lower track. The rearward openings 38 are each formed in the lower track central portion 31 of the lower track Sand are sized relative to the through portion 88 of the rearward fastener portion 78 to allow at least some movement of the rearward fastener portion 78 relative to the lower track in the forward—rearward (longitudinal axial) direction. The forward fastener fixes the forward cross web portion 73F relative to the lower track in the direction away from the lower track and in the lateral directions and allows at least some movement of the forward cross web portion relative to the lower track at least in the longitudinal axial directions.

While specific embodiments of the invention have been shown and described in detail to illustrate the application of the principles of the invention, it will be understood that the invention may be embodied otherwise without departing from such principles.

What is claimed is:

1. A track system for a vehicle seat, the track system comprising:
    a lower track having a track profile comprising a lower track central portion and lower track side profile portions connected together by the lower track central portion, the lower track central portion including a lower vehicle attachment surface and an upper surface, the lower track extending in longitudinal axial directions between a lower track forward end and a lower track rearward end and the lower track extending in lateral directions between a lateral extent of a first one of the lower track side profile portions and a lateral extent of a second one of the lower track side profile portions;
    a slide block comprising a first slide bar extending along the upper surface at a first lower track lateral side, a second slide bar extending along the upper surface at a second lower track lateral side, and a cross web system connecting the first slide bar to the second slide bar and extending across the upper surface of the lower track in the lateral directions between the lower track side profile portions, the cross web system comprising a central cross web portion, a forward cross web portion positioned with respect to the longitudinal axial directions between the lower track forward end and the central cross web portion, and a rearward cross web portion positioned with respect to the longitudinal axial directions between the lower track rearward end and the central cross web portion;
    a lower track to slide block fastening system comprising a central fastener configured to limit movement of the central cross web portion relative to the lower track at least in the lateral directions and in the longitudinal axial directions and to allow movement of the central cross web portion relative to the lower track in a direction toward the lower track and in a direction away from the lower track, a forward fastener configured to limit movement of the forward cross web portion relative to the lower track in the direction away from the lower track and to allow movement of the forward cross web portion relative to the lower track in the longitudinal axial directions, and a rearward fastener configured to limit movement of the rearward cross web portion relative to the lower track in the direction away from the lower track and to allow movement of the rearward cross web portion relative to the lower track at least in the longitudinal axial directions, wherein the rearward fastener comprises a rearward fastener portion connected to the rearward cross web portion, wherein the rearward fastener portion has a through portion extending through a rearward opening formed in the lower track from an upper surface side of the lower track to a lower vehicle attachment surface side of the lower track, wherein the rearward opening is positioned relative to the central fastener and is sized relative to the through portion of the rearward fastener portion for movement of the rearward fastener portion within the rearward opening in the longitudinal axial directions to allow for a deflection of the slide block relative to the lower track and wherein the slide block has end stops;
    an upper track having a first lower surface engaging and slidable along the first slide bar and a second lower surface engaging and slidable along the second slide bar for moving relative to the lower track; and
    a first rolling bearing cage connected to the upper track and configured to position rolling bearings between the upper track and the lower track, wherein the slide block is configured to support the movement of the upper track and the end stops of the slide block are configured to limit movement of the first rolling bearing cage.

2. A track system according to claim 1, wherein the central fastener comprises:
    a central fastener portion connected to the central cross web portion, the central fastener portion extending through a central opening formed in the lower track and configured to engage at least portions of an inner peripheral edge of the central opening, whereby movement of the central fastener portion relative to the lower track is restricted by the inner peripheral edge in all radial directions of the central fastener portion relative to the central opening.

3. A track system according to claim 2, wherein the central fastener portion has a fastener profile extending through and substantially coaxial with the central opening to allow the movement of the central cross web portion relative to the lower track in the direction toward the lower track and in the direction away from the lower track.

4. A track system according to claim 1, wherein the forward fastener comprises:
    a forward fastener portion connected to the forward cross web portion, the forward fastener portion having a through portion extending through a forward opening formed in the lower track from the upper surface side of the lower track to the lower vehicle attachment surface side of the lower track and the forward fastener portion including an axial extension extending axially beyond an inner peripheral edge of the forward opening and the axial extension of the forward fastener portion including an axially extending surface to engage the lower vehicle attachment surface and limit movement of the forward cross web portion relative to the lower track in a vertical direction away from the lower track.

5. A track system according to claim 4, wherein the forward opening formed in the lower track is sized relative to the through portion of the forward fastener portion to allow movement of the forward fastener portion relative to the lower track in the longitudinal axial directions.

6. A track system according to claim 1, wherein the rearward fastener portion includes an axial extension extending axially beyond an inner peripheral edge of the rearward opening and the axial extension of the rearward fastener portion includes an axially extending surface to engage the lower vehicle attachment surface and limit movement of the rearward cross web portion relative to the lower track in a vertical direction away from the lower track.

7. A track system according to claim 1, wherein the slide block is a single integral plastic part including the central fastener, the forward fastener, and the rearward fastener.

8. A track system according to claim 1, wherein the first slide bar and the second slide bar are parallel slide block brackets.

9. A track system according to claim 8, wherein the end stops of the slide block comprise two first slide bar end stops extending outwards from the first slide bar and two second slide bar end stops extending outwards from the second slide bar.

10. A track system according to claim 8, further comprising a second rolling bearing cage, wherein the first and second rolling bearing cages are arranged on opposite sides of the upper track.

11. A track system according to claim 10, wherein:
each of the first and second rolling bearing cages has a contact portion at each of two longitudinal ends, each of the contact portions of the first rolling bearing cage being complementary to a respective one of the first slide bar end stops, each of the contact portions of the second rolling bearing cage being complementary to a respective one of the second slide bar end stops, whereby with respect to the longitudinal axial directions, the first slide bar end stops and the second slide bar end stops are configured to limit a travel of the first rolling bearing cage and a travel of the second rolling bearing cage, respectively; and
each of the contact portions of each of the first and second rolling bearing cages is formed of an elastically deformable material, whereby each of the contact portions of each of the first and second rolling bearing cages is configured to be deformed upon bearing on an associated one of the first and second slide bar end stops and, upon sliding away from the associated one of the first and second slide bar end stops, return to an original form.

12. A vehicle seat comprising:
a seat base;
a track system connected to the seat base, the track system comprising:
a lower track having a track profile comprising a lower track central portion and lower track side profile portions connected together by the lower track central portion, the lower track central portion including a lower vehicle attachment surface and an upper surface, the lower track extending in longitudinal axial directions between a lower track forward end and a lower track rearward end and the lower track extending in lateral directions between a lateral extent of a first one of the lower track side profile portions and a lateral extent of a second one of the lower track side profile portions;
a slide block comprising a first slide bar extending along the upper surface at a first lower track lateral side, a second slide bar extending along the upper surface at a second lower track lateral side, and a cross web system connecting the first slide bar to the second slide bar and extending across the upper surface of the lower track in the lateral directions between the lower track side profile portions, the cross web system comprising a central cross web portion, a forward cross web portion positioned with respect to the longitudinal axial directions between the lower track forward end and the central portion, and a rearward cross web portion positioned with respect to the longitudinal axial directions between the lower track rearward end and the central cross web portion; and
a lower track to slide block fastening system comprising a central fastener configured to limit movement of the central cross web portion relative to the lower track in the lateral directions and in the longitudinal axial directions and to allow movement of the central cross web portion relative to the lower track in a direction toward the lower track and in a direction away from the lower track, a forward fastener configured to limit movement of the forward cross web portion relative to the lower track in the direction away from the lower track and to allow movement of the forward cross web portion relative to the lower track in the longitudinal axial directions, and a rearward fastener configured to limit movement of the rearward cross web portion relative to the lower track in the direction away from the lower track and to allow movement of the rearward cross web portion relative to the lower track in the longitudinal axial directions, wherein the forward fastener comprises a forward fastener portion connected to the forward cross web portion, the forward fastener portion having a through portion extending through a forward opening formed in the lower track from an upper surface side of the lower track to a lower vehicle attachment surface side of the lower track and the forward fastener portion including an axial extension extending axially beyond an inner peripheral edge of the forward opening and the axial extension of the forward fastener portion including an axially extending surface to engage the lower vehicle attachment surface and limit movement of the forward cross web portion relative to the lower track in a vertical direction away from the lower track, wherein the forward opening formed in the lower track is sized relative to the through portion of the forward fastener portion to allow movement of the forward fastener portion relative to the lower track in the longitudinal axial directions, wherein the rearward fastener comprises a rearward fastener portion connected to the rearward cross web portion, the rearward fastener portion has a through portion extending through a rearward opening formed in the lower track from the upper surface side of the lower track to the lower vehicle attachment surface side of the lower track, wherein the rearward opening is positioned relative to the central fastener and is sized relative to the through portion of the rearward fastener portion for movement of the rearward fastener portion within the rearward opening in the longitudinal axial directions to allow movement of the rearward fastener portion relative to the lower track in the longitudinal axial directions and wherein the slide block has end stops and wherein the slide block is a single integral plastic part including the central fastener, the forward fastener and the rearward fastener;
an upper track having a first lower surface engaging and slidable along the first slide bar and a second lower surface engaging and slidable along the second slide bar for moving relative to the lower track; and
a rolling bearing cage connected to the upper track and configured to position rolling bearings between the upper track and the lower track, wherein the slide block is configured to support the movement of the upper track and the end stops of the slide block are configured to limit movement of the rolling bearing cage.

13. A vehicle seat according to claim 12, wherein the central fastener comprises:
a central fastener portion connected to the central cross web portion, the central fastener portion extending through a central opening formed in the lower track and configured to engage at least portions of an inner peripheral edge of the central opening, whereby movement of the central fastener portion relative to the lower track is restricted by the inner peripheral edge in all radial directions of the central fastener portion relative to the central opening.

14. A vehicle seat according to claim 13, wherein the central fastener portion has a fastener profile extending through and substantially coaxial with the central opening to allow movement of the central cross web portion relative to the lower track in a vertical direction toward the lower track and in the vertical direction away from the lower track.

15. A vehicle seat according to claim 13, wherein the rearward fastener portion includes an axial extension extending axially beyond an inner peripheral edge of the rearward opening, and the axial extension of the rearward fastener portion includes an axially extending surface to engage the lower vehicle attachment surface and limit movement of the rearward cross web portion relative to the lower track in the vertical direction away from the lower track.

16. A track system for a vehicle seat, the track system comprising:
- a lower track having a track profile comprising a lower track central portion and lower track side profile portions connected together by the lower track central portion, the lower track central portion including a lower vehicle attachment surface and an upper surface, the lower track extending in longitudinal axial directions between a lower track forward end and a lower track rearward end and the lower track extending in lateral directions between a lateral extent of a first one of the lower track side profile portions and a lateral extent of a second one of the lower track side profile portions;
- a slide block comprising a first slide bar extending along the upper surface at a first lower track lateral side, a second slide bar extending along the upper surface at a second lower track lateral side, and a cross web system connecting the first slide bar to the second slide bar and extending across the upper surface of the lower track in the lateral directions between the lower track side profile portions, the cross web system comprising a central cross web portion, a forward cross web portion positioned with respect to the longitudinal axial directions between the lower track forward end and the central cross web portion, and a rearward cross web portion positioned with respect to the longitudinal axial directions between the lower track rearward end and the central cross web portion;
- a lower track to slide block fastening system comprising a central fastener configured to limit movement of the central cross web portion relative to the lower track at least in the lateral directions and in the longitudinal axial directions, a forward fastener configured to limit movement of the forward cross web portion relative to the lower track in a vertical direction away from the lower track and to allow movement of the forward cross web portion relative to the lower track in the longitudinal axial directions, and a rearward fastener configured to limit movement of the rearward cross web portion relative to the lower track in the vertical direction away from the lower track and to allow movement of the rearward cross web portion relative to the lower track at least in the longitudinal axial directions, wherein the forward fastener comprises a forward fastener portion connected to the forward cross web portion, the forward fastener portion having a through portion extending through a forward opening formed in the lower track from an upper surface side of the lower track to a lower vehicle attachment surface side of the lower track and the forward fastener portion including an axial extension extending axially beyond an inner peripheral edge of the forward opening and the axial extension of the forward fastener portion including an axially extending surface to engage the lower vehicle attachment surface and limit the movement of the forward cross web portion relative to the lower track in the vertical direction away from the lower track, wherein the forward opening formed in the lower track is sized relative to the through portion of the forward fastener portion to allow movement of the forward fastener portion relative to the lower track in the longitudinal axial directions and to thereby allow the movement of the forward cross web portion relative to the lower track in the longitudinal axial directions, wherein the rearward fastener comprises a rearward fastener portion connected to the rearward cross web portion, the rearward fastener portion has a through portion extending through a rearward opening formed in the lower track from the upper surface side of the lower track to the lower vehicle attachment surface side of the lower track, wherein the rearward fastener portion includes an axial extension extending axially beyond an inner peripheral edge of the rearward opening, the axial extension of the rearward fastener portion includes an axially extending surface to engage the lower vehicle attachment surface and limit the movement of the rearward cross web portion relative to the lower track in the vertical direction away from the lower track, wherein the rearward opening is positioned relative to the central fastener and is sized relative to the through portion of the rearward fastener portion for movement of the rearward fastener portion within the rearward opening in the longitudinal axial directions to allow for movement of the rearward fastener portion relative to the lower track in the longitudinal axial directions and thereby allow the movement of the rearward cross web portion relative to the lower track in the longitudinal axial directions, wherein the central fastener comprises a central fastener portion connected to the central cross web portion, the central fastener portion having a fastener profile extending through and substantially coaxial with a central opening formed in the lower track to allow movement of the central cross web portion relative to the lower track in a vertical direction toward the lower track and in the vertical direction away from the lower track and configured to engage at least portions of an inner peripheral edge of the central opening to limit movement of the central fastener portion relative to the lower track in all radial directions of the central fastener portion and thereby limit movement of the central cross web portion relative to the lower track in all radial directions of the central fastener portion relative to the central opening, wherein the first slide bar has a first front stop and a first rear stop and the second slide bar has a second front stop and a second rear stop, and wherein the slide block is a single integral plastic part including the central fastener, the forward fastener, and the rearward fastener;
- an upper track having a first lower surface engaging and slidable along the first slide bar and a second lower surface engaging and slidable along the second slide bar for moving relative to the lower track;
- a first rolling bearing cage connected to the upper track and configured to position rolling bearings between the upper track and the lower track, wherein the first front stop and the first rear stop are configured to limit movement of the first rolling bearing cage relative to the slide block; and
- a second rolling bearing cage connected to the upper track and configured to position further rolling bearings between the upper track and the lower track, wherein the second front stop and the second rear stop are configured to limit movement of the second rolling bearing cage relative to the slide block.

\* \* \* \* \*